(12) United States Patent
Hecht

(10) Patent No.: US 8,308,398 B2
(45) Date of Patent: Nov. 13, 2012

(54) CUTTING TOOL HAVING AN ADJUSTMENT MECHANISM

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 595 days.

(21) Appl. No.: 12/638,728

(22) Filed: Dec. 15, 2009

(65) Prior Publication Data

US 2010/0178118 A1 Jul. 15, 2010

(30) Foreign Application Priority Data

Jan. 11, 2009 (IL) .......................................... 196440

(51) Int. Cl.
*B23C 5/24* (2006.01)
(52) U.S. Cl. ............ 407/38; 407/44; 407/103; 408/158; 408/181
(58) Field of Classification Search .................. 407/36, 407/40, 44, 45, 46, 48, 77, 85–87, 101–108; 408/158, 181, 153, 161, 190, 191; *B23C 5/24*
See application file for complete search history.

(56) References Cited

U.S. PATENT DOCUMENTS

| | | | | | |
|---|---|---|---|---|---|
| 4,318,647 | A | * | 3/1982 | Erkfritz | 408/153 |
| 4,592,680 | A | * | 6/1986 | Lindsay | 407/36 |
| 4,938,638 | A | * | 7/1990 | Hessman et al. | 407/39 |
| 5,217,330 | A | * | 6/1993 | Dennstedt | 407/37 |
| 5,716,167 | A | | 2/1998 | Siddle et al. | |
| 5,863,156 | A | * | 1/1999 | Satran et al. | 407/36 |
| 6,033,157 | A | * | 3/2000 | Satran et al. | 407/37 |
| 6,056,484 | A | * | 5/2000 | Mitchell et al. | 407/36 |
| 6,086,290 | A | | 7/2000 | Qvarth et al. | |
| 6,155,753 | A | * | 12/2000 | Chang | 407/92 |
| 6,511,264 | B2 | * | 1/2003 | Ripley | 407/36 |
| 6,619,892 | B2 | * | 9/2003 | Enquist | 407/36 |
| 6,655,879 | B2 | * | 12/2003 | Grehn | 407/44 |
| 6,942,431 | B2 | * | 9/2005 | Pantzar et al. | 407/36 |
| 7,014,393 | B2 | * | 3/2006 | Matheis | 407/37 |
| 7,275,894 | B2 | * | 10/2007 | Schlagenhauf et al. | 407/37 |
| 8,092,124 | B2 | * | 1/2012 | Spichtinger et al. | 407/39 |
| 2004/0156688 | A1 | | 8/2004 | Matheis | |
| 2005/0254907 | A1 | * | 11/2005 | Bader et al. | 407/36 |
| 2010/0215445 | A1 | * | 8/2010 | Chen et al. | 407/36 |
| 2012/0082522 | A1 | * | 4/2012 | Hecht et al. | 407/105 |
| 2012/0213600 | A1 | * | 8/2012 | Hecht | 407/102 |

FOREIGN PATENT DOCUMENTS

DE 4136353 A1 * 7/1993
(Continued)

*Primary Examiner* — Andrea Wellington
*Assistant Examiner* — Sara Addisu
(74) *Attorney, Agent, or Firm* — Womble Carlyle

(57) ABSTRACT

A cutting tool has an adjustment mechanism for adjusting the location of a cutting insert seated therein. The cutting tool has a tool body provided with an adjustment bore and an abutment member bore intersecting the adjustment bore, and also has an abutment member and a worm screw. The abutment member is located in the abutment member bore and the worm screw is located in the adjustment bore and screw threaded into the worm screw bore. The abutment member is located in a first location along the abutment member bore when the worm screw is in a first screw rotated position and the abutment member is located in a second location along the abutment member bore when the worm screw is in a second screw rotated position.

12 Claims, 4 Drawing Sheets

FOREIGN PATENT DOCUMENTS

| | | | |
|---|---|---|---|
| DE | 20 2004 020267 | | 5/2006 |
| DE | 10 2007 030876 | | 1/2009 |
| EP | 410129 A2 | * | 1/1991 |
| FR | 95 385 | | 9/1970 |
| JP | 01295709 A | * | 11/1989 |
| JP | 08039325 A | * | 2/1996 |
| JP | 2006150491 A | * | 6/2006 |
| JP | 2007038330 A | * | 2/2007 |
| JP | 2007136633 A | * | 6/2007 |
| WO | WO 9955479 A1 | * | 11/1999 |
| WO | WO 2008114242 A1 | * | 9/2008 |

* cited by examiner

CUTTING TOOL HAVING AN ADJUSTMENT MECHANISM

FIELD OF THE INVENTION

The present invention relates to a cutting tool having an adjustment mechanism for adjusting the location of a cutting insert secured in an insert pocket.

BACKGROUND OF THE INVENTION

There are known in the art many different mechanisms for adjusting the location of a cutting insert secured in an insert pocket. Some of these mechanisms can be used for machining at high operating speeds. For example, U.S. Pat. No. 5,716,167 describes a milling cutter having an adjustment mechanism. This cutter has a certain disadvantage in terms of adjustment accuracy, the radial centrifugal forces stressing the tool may cause displacement of the cartridge securing the insert. From FIG. 2 it can be seen that the screws for adjusting the cartridge have a radial component. This geometric characteristic is best avoided when the tool operates at high speeds since even a small radial component of the centrifugal force may be large enough to cause inaccuracies.

U.S. Pat. No. 6,086,290 utilizes a cartridge holding a cutting insert. Both the cutting insert and the cartridge have an elongated securing bore and a corresponding screw used to secure and adjust the location of the cutting insert or the cartridge. The adjustment mechanism also provides a method of adjusting the orientation of the cartridge with an abutting adjustment screw at the lower surface of the cartridge. At least two of the screws have a fairly large radial component allowing centrifugal forces to possibly cause inaccuracies.

The abovementioned adjustment mechanisms require that at least one threaded bore drilled into the tool body. This prevents the use of tool bodies made, for example, from aluminum since an aluminum based thread is significantly weaker in comparison to, and for example, steel based threads. Furthermore, having to drill threaded bores into the tool body increases the complexity of production, and consequently, the production costs.

SUMMARY OF THE INVENTION

In one aspect, the present invention is directed to a cutting tool having an adjustment mechanism. The cutting tool in accordance with one aspect of the invention has a tool body, an abutment member and a worm screw. The tool body includes an insert pocket having a base surface and a sidewall; a sidewall aperture located in the sidewall; an abutment member bore opening out to the sidewall at the sidewall aperture, the abutment member bore having an abutment member axis (M) defining an upward to downward direction; and an adjustment bore intersecting the abutment member bore, the adjustment bore having an adjustment bore axis (B) defining an inner to outer direction and an adjustment bore diameter $D_{AB}$. The abutment member includes an abutment member peripheral surface extending between an abutment member upper surface and an abutment member lower surface; an abutment surface; and a worm screw bore formed in the abutment member peripheral surface, the worm screw bore having a worm screw bore axis (W). The worm screw includes a worm screw thread, a worm screw end face and a worm screw diameter $D_{WS}$, with $D_{AB} > D_{WS}$. The abutment member occupies the abutment member bore and the worm screw occupies the adjustment bore with the worm screw thread engaging the worm screw bore formed in the abutment member. The worm screw is rotatable between: a first screw rotated position in which the abutment member is located in a first position along the abutment member bore axis (M); and a second screw rotated position in which the abutment member is located in a second position along the abutment member bore axis (M).

The worm screw may have a worm screw end face, the adjustment bore may have an end surface located at an inner end of the adjustment bore, the worm screw end face may abut the adjustment bore end surface and rotating the worm screw in one direction may cause the worm screw to travel within the adjustment bore in an upward direction along the abutment member axis (M).

The abutment member bore may have an abutment member bore bottom; in the first screw rotated position, the abutment member lower surface is a first distance d1 from the abutment member bore bottom; in the second screw rotated position, the abutment member lower surface is a second distance d2 from the abutment member bore bottom; and d2>d1.

Both the abutment member bore and the adjustment bore may be unthreaded.

The worm screw may travel along the abutment member bore axis (M) as it is rotated from the first screw rotated position to the second screw rotated position.

The cutting tool may have an axis of rotation (A) and the abutment member bore axis (M) is transverse to the axis of rotation (A) of the cutting tool.

The worm screw is rotatable about the worm screw bore axis (W) formed in the abutment member.

The abutment member may have a generally cylindrical cross section.

The adjustment bore may have a generally cylindrical cross section.

A cutting insert may be seated in the insert pocket and a securing screw may secure the cutting insert to the insert pocket.

The abutment surface of the abutment member is formed in one or both of the abutment member peripheral surface and the abutment member upper surface, the abutment surface of the abutment member may at least partially protrude from the sidewall aperture, the cutting insert may have an insert abutment surface, with the abutment surface of the abutment member abutting the insert abutment surface. Rotating the worm screw in one direction causes the abutment surface of the abutment member to urge the cutting insert in a direction away from the sidewall and also causes the worm screw to travel within the adjustment bore in an upward direction along the abutment member axis (M).

BRIEF DESCRIPTION OF THE DRAWINGS

For a better understanding of the present invention and to show how the same may be carried out in practice, reference will now be made to the accompanying drawings, in which.

Figure 1:
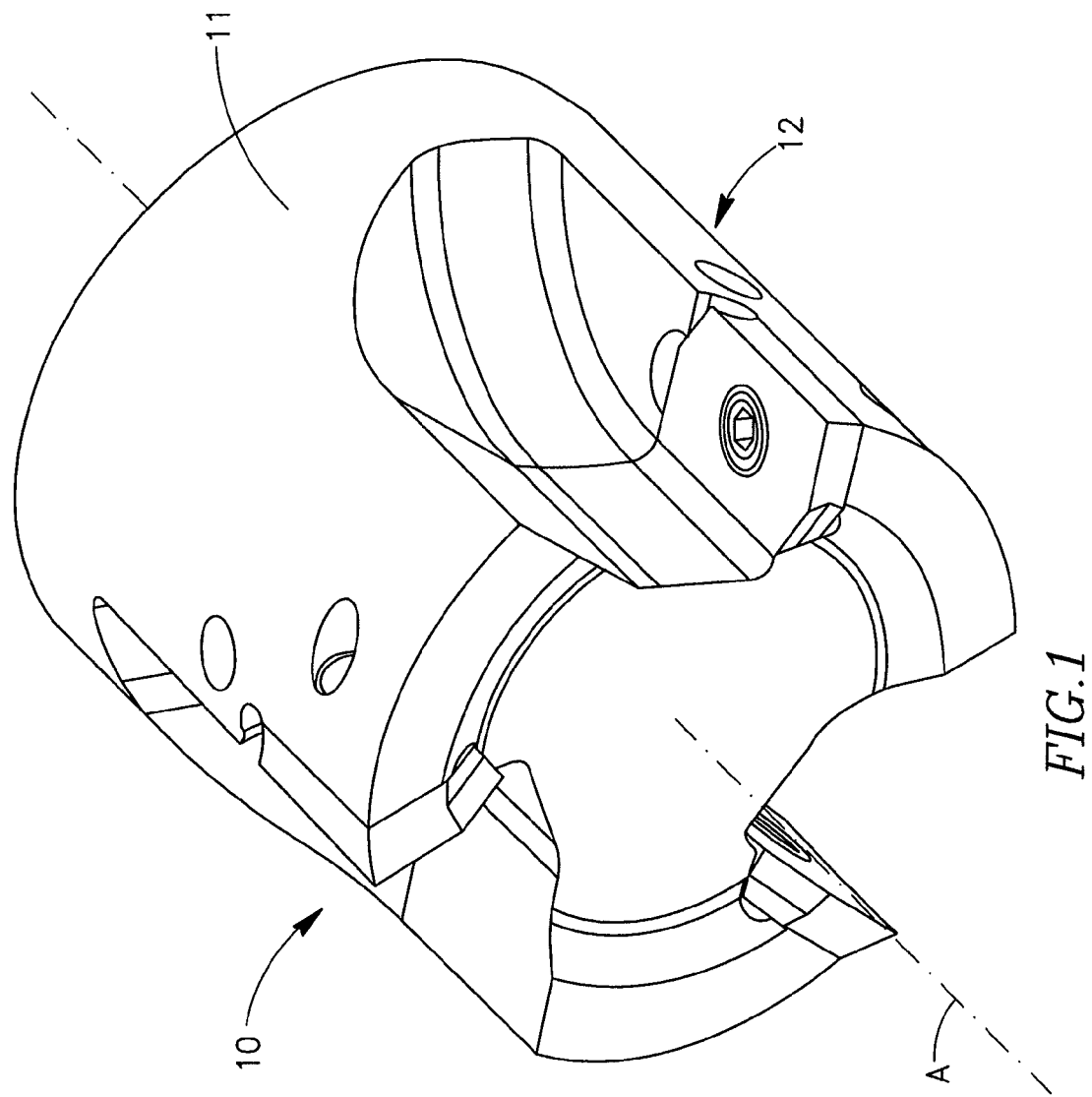
FIG. 1 is a perspective view of a cutting tool according to the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

Figure 2:
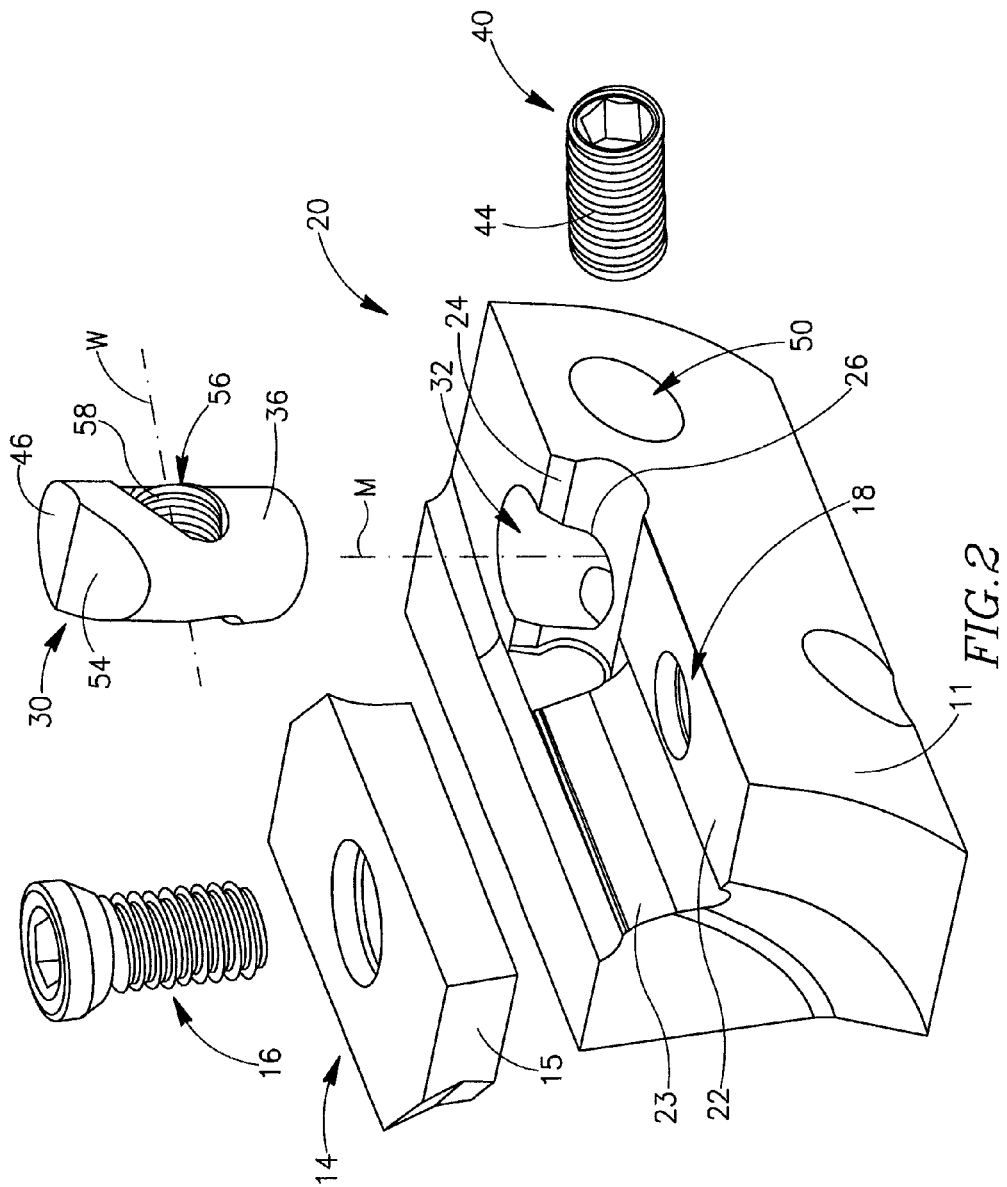
FIG. 2 is a perspective exploded view of a cutting portion of the cutting tool shown in FIG. 1.

Reference is made to the figures in general and specifically to FIG. 1 showing a cutting tool 10 in accordance with embodiments of the present invention and to FIG. 2 showing a cutting portion 12 of the cutting tool 10. The cutting tool 10 has an axis of rotation A and a tool body 11 provided with at least three cutting portions 12. Each cutting portion 12 has an insert pocket 18 in which a cutting insert 14 having an insert abutment surface 15 may be retained by a securing screw 16. The number of cutting portions 12 is not limited to three. The cutting insert 14 is typically made of extremely hard and wear-resistant material such as cemented carbide, either by form-pressing or by injection molding and sintering carbide powders in a binder. The cemented carbide may be, for example, tungsten carbide. The cutting insert may be coated or uncoated. The axis of rotation A defines a forward to rear direction, with the cutting portions 12 being located at a forward end of the cutting tool 10. Each cutting insert 14 is in communication with an adjusting mechanism 20 by means of which the location of the cutting insert 14 may be adjusted. For example, in some embodiments, the axial location of the cutting insert 14 may be adjusted.

The insert pocket 18 comprises a base surface 22 and a sidewall 24, extending from the base surface 22. As can be seen in FIG. 2, in accordance with embodiments of the present invention the sidewall 24 constitutes an axial sidewall. In accordance with some embodiments the insert pocket 18 also has an additional sidewall 23 which constitutes a radial sidewall. According to some embodiments, the sidewall 24 may be provided with a sidewall aperture 26. The adjusting mechanism 20 comprises an abutment member 30 located in an abutment member bore 32. The abutment member bore 32 opens out to the sidewall 24 at the sidewall aperture 26. The abutment member bore 32 has an abutment member bore axis M, defining an upward to downward direction, and an abutment member bore bottom 34 (see FIG. 6). An adjustment bore 50 has an adjustment bore axis B, an adjustment bore diameter $D_{AB}$ and an adjustment bore end surface 52. The adjustment bore 50 intersects the abutment member bore 32. The abutment member bore 32 and the adjustment bore 50 may be unthreaded. A worm screw 40 having a worm screw end face 42 and a worm screw thread 44 (see FIG. 5) is located in the adjustment bore 50. In accordance with some embodiments, the sidewall aperture 26 may be located in sidewall 23 instead of in sidewall 24.

The abutment member 30 is generally cylindrical in shape having an abutment member peripheral surface 36 extending between abutment member upper and lower surfaces 46, 48 respectively. Extending from the abutment member upper surface 46 is an abutment surface 54 which may partially protrude from the sidewall aperture 26. The abutment member upper surface 46 and the abutment surface 54 may be non-coplanar. The abutment member 30 has a worm screw bore 56 having a worm screw bore axis W that is transverse to the abutment member bore axis M. The worm screw bore 56 is a through bore and has a worm screw bore thread 58. The worm screw bore 56 opens out to the abutment member peripheral surface 36. The worm screw 40 has a worm screw axis S and a worm screw diameter $D_{WS}<D_{AB}$.

Figure 3:
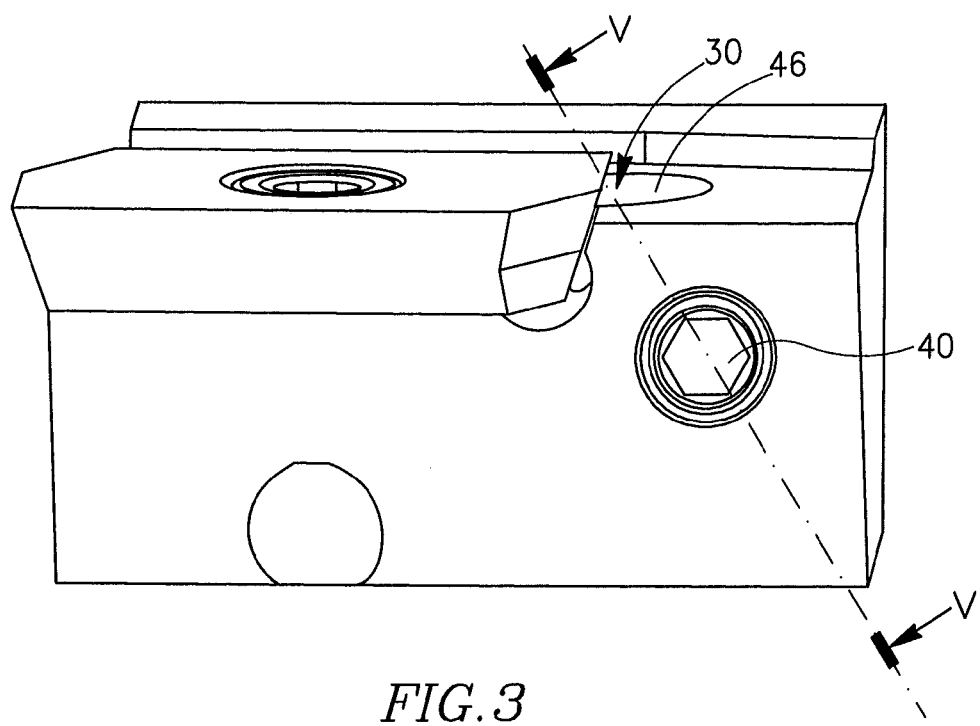
FIG. 3 is a side view of a cutting portion of the cutting tool shown in FIG. 1 showing the cutting insert in a first adjusted position.
Figure 4:
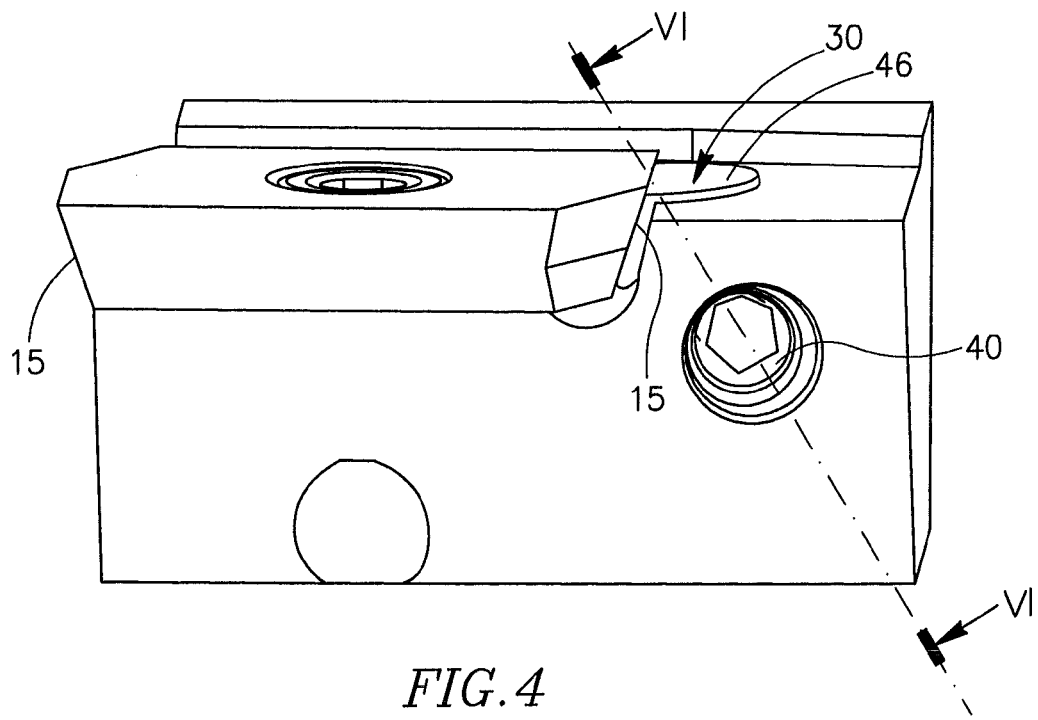
FIG. 4 is a side view of the cutting portion shown in FIG. 3 showing the cutting insert in a second adjusted position.
Figure 5:
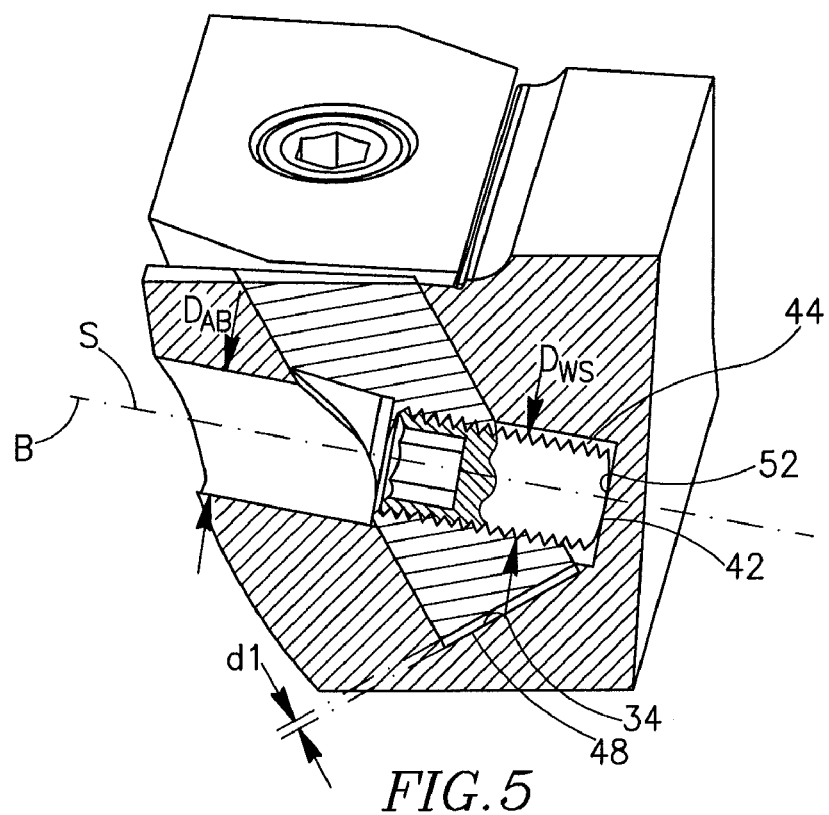
FIG. 5 is a cross-sectional view taken along the line V-V of FIG. 3.

In order to adjust the location of the cutting insert 14 the worm screw 40 is screw rotated in the worm screw bore 56 about the worm screw axis S whilst the worm screw end face 42 is in abutment with the adjustment bore end surface 52. Reference is made to FIG. 5 where the adjustment mechanism 20 is in a first adjusting position wherein the worm screw 40 is in a first screw rotated position and the abutment member 30 is located a first distance d1 (which distance d1 may be zero) along the abutment member bore axis M relative to the abutment member bore bottom 34. By rotating the worm screw 40 clockwise (for a right-hand thread) to a second rotated position, the abutment member 30 is moved upwards along the abutment member bore axis M to a second distance d2 relative to the abutment member bore bottom 34, with d2>d1. This upward axial displacement is translated, as seen in a side view in FIG. 3 and according to some embodiments, into forward axial displacement of the cutting insert 14 along the direction of the axis of rotation A by means of the abutment between the insert abutment surface 15 and the abutment surface 54. The worm screw 40, whilst being screw threaded in the worm screw bore 56, will travel simultaneously with the abutment member 30 upwardly, along the abutment member bore axis M, within the adjustment bore 50.

Figure 6:
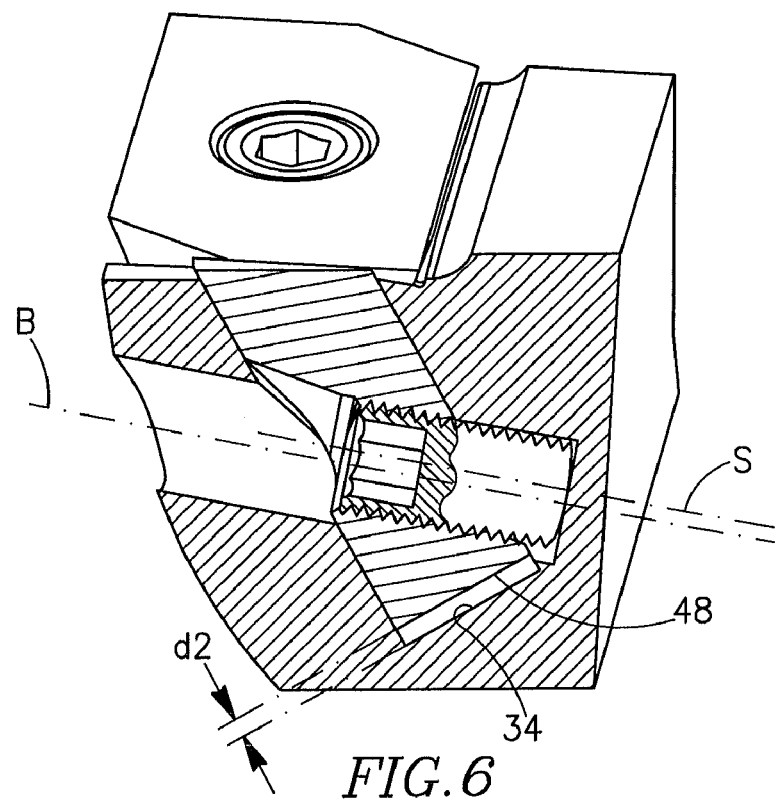
FIG. 6 is a cross-sectional view taken along the line VI-VI of FIG. 4.

Reference is now made to FIG. 6 where the adjustment mechanism 20 is in a second position and the worm screw 40 is in the second screw rotated position. The abutment surface 54 is now in a second location relative to the abutment member bore bottom 34 and the cutting insert 14 is accordingly in a second location. This simultaneous axial movement of the abutment member 30 and the worm screw 40 along the abutment member bore axis M is made possible due to the fact that the worm screw end face 42 of the worm screw 40 is in abutment with the adjustment bore end surface 52 and therefore cannot move inward along the adjustment bore axis B. Consequently, as the worm screw 40 is screw rotated clockwise (for a right-hand thread) the abutment member 30 is constrained to move upwards inside the abutment member bore 32 along the abutment member bore axis M and the worm screw 40, which is located in the worm screw bore 56, moves with it. This is possible since the adjustment bore diameter $D_{AB}$ is larger than the worm screw diameter $D_{WS}$.

In accordance with some embodiments, the abutment member 30 has a certain amount of rotational freedom of movement about the abutment member bore axis M. In accordance with some embodiments, there may be a certain amount of freedom of movement between the worm screw bore thread 58 and the worm screw thread 44. When the worm screw 40 is rotated, these degrees of freedom allow the abutment surface 54 to adjust its orientation until it becomes parallel to the insert abutment surface 15.

The abutment member bore axis M is oriented transversely to the cutting tool axis of rotation A in order to minimize centrifugal forces in the direction of the abutment member bore axis M, which at high operating speeds can cause inaccuracies.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool comprising:
   a tool body comprising:
   an insert pocket having a base surface and a sidewall;
   a sidewall aperture located in the sidewall;
   an abutment member bore opening out to the sidewall at the sidewall aperture, the abutment member bore having an abutment member axis (M) defining an upward to downward direction; and
   an adjustment bore intersecting the abutment member bore, the adjustment bore having an adjustment bore axis (B) defining an inner to outer direction and an adjustment bore diameter $D_{AB}$;
   an abutment member comprising:
   an abutment member peripheral surface extending between an abutment member upper surface and an abutment member lower surface;
   an abutment surface; and
   a worm screw bore formed in the abutment member peripheral surface, the worm screw bore having a worm screw bore axis (W); and
   a worm screw having a worm screw thread and a worm screw diameter $D_{WS}$, with $D_{AB} > D_{WS}$;
   wherein:
   the abutment member occupies the abutment member bore;
   the worm screw occupies the adjustment bore with the worm screw thread engaging the worm screw bore formed in the abutment member; and
   the worm screw is rotatable between:
      a first screw rotated position in which the abutment member is located in a first position along the abutment member bore axis (M); and
      a second screw rotated position in which the abutment member is located in a second position along the abutment member bore axis (M).

2. The cutting tool according to claim 1, wherein:
   the worm screw has a worm screw end face;
   the adjustment bore has an end surface located at an inner end of the adjustment bore;
   the worm screw end face abuts the adjustment bore end surface; and
   rotating the worm screw in one direction causes the worm screw to travel within the adjustment bore along the abutment member axis (M).

3. The cutting tool according to claim 1, wherein:
   the abutment member bore has an abutment member bore bottom;
   in the first screw rotated position, the abutment member lower surface is a first distance d1 from the abutment member bore bottom;
   in the second screw rotated position, the abutment member lower surface is a second distance d2 from the abutment member bore bottom; and
   d2>d1.

4. The cutting tool according to claim 1, wherein:
   both the abutment member bore and the adjustment bore are unthreaded.

5. The cutting tool according to claim 1, wherein the worm screw travels along the abutment member bore axis (M) as it is rotated from the first screw rotated position to the second screw rotated position.

6. The cutting tool according to claim 1, wherein:
   the cutting tool has an axis of rotation (A) and
   the abutment member bore axis (M) is transverse to the axis of rotation (A) of the cutting tool.

7. The cutting tool according to claim 1, wherein:
   the worm screw is rotatable about the worm screw bore axis (W) formed in the abutment member.

8. The cutting tool according to claim 1, wherein:
   the abutment member has a generally cylindrical cross section.

9. The cutting tool according to claim 1, wherein the adjustment bore has a generally cylindrical cross section.

10. The cutting tool according to claim 1, further comprising:
    a cutting insert seated in the insert pocket.

11. The cutting tool according to claim 10, further comprising:
    a securing screw securing the cutting insert to the insert pocket.

12. The cutting tool according to claim 10, wherein:
    The abutment surface of the abutment member is formed in one or both of the abutment member peripheral surface and the abutment member upper surface;
    the abutment surface of the abutment member at least partially protrudes from the sidewall aperture;
    the cutting insert has an insert abutment surface;
    the abutment surface of the abutment member abuts the insert abutment surface; and
    rotating the worm screw in one direction causes:
       the abutment surface of the abutment member to urge the cutting insert in a direction away from the sidewall; and
       the worm screw to travel within the adjustment bore in an upward direction along the abutment member axis (M).

* * * * *